United States Patent
Kelly et al.

(10) Patent No.: US 6,422,947 B1
(45) Date of Patent: Jul. 23, 2002

(54) DRIVESHAFT BEARING ASSEMBLY

(75) Inventors: Francis X. Kelly, Canton; Gary Keith Parker, Shelby Township; Walter J Golembiewski, Washington, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/502,687

(22) Filed: Feb. 11, 2000

(51) Int. Cl.[7] ................................................. F16C 1/28
(52) U.S. Cl. ....................................... 464/182; 464/178
(58) Field of Search ....................... 219/121.64; 464/182, 464/185, 180, 178

(56) References Cited

U.S. PATENT DOCUMENTS

| | | | |
|---|---|---|---|
| 1,749,281 A | * 3/1930 | Hambleton | 464/178 |
| 2,857,974 A | * 10/1958 | Heller | 464/178 |
| 3,053,584 A | * 9/1962 | Dunn | 464/178 |
| 3,466,104 A | * 9/1969 | Norrie et al. | 464/178 |
| 3,704,922 A | * 12/1972 | Kleinschmidt et al. | 308/26 |
| 3,744,274 A | * 7/1973 | Sekiya et al. | 464/180 |
| 3,756,675 A | * 9/1973 | Manigiavacchi | 464/181 |
| 3,769,117 A | * 10/1973 | Bowen et al. | 219/121.64 |
| 4,185,880 A | * 1/1980 | Shiomi et al. | 308/189 R |
| 4,430,066 A | * 2/1984 | Benassi | 464/178 |
| 4,550,237 A | 10/1985 | Merkelbach | |
| 4,551,116 A | * 11/1985 | Krude | 464/181 |
| 4,747,806 A | * 5/1988 | Krude et al. | 464/182 |
| 4,804,233 A | 2/1989 | Hoffman et al. | |
| 5,145,025 A | * 9/1992 | Damian | 180/381 |
| 5,188,194 A | * 2/1993 | Gasch | 464/180 |
| 5,333,939 A | * 8/1994 | Krude et al. | 301/124.1 |
| 5,358,066 A | * 10/1994 | Shope | 180/380 |
| 5,407,386 A | * 4/1995 | Kish et al. | 464/160 |
| 6,111,213 A | * 8/2000 | Suchier | 219/121.63 |
| 6,288,359 B1 | * 9/2001 | Koch et al. | 219/121.63 |

FOREIGN PATENT DOCUMENTS

| | | |
|---|---|---|
| DE | 197 31 331 A1 | 7/1997 |
| GB | 2 199 390 A | 6/1988 |
| GB | 2 280 938 | 2/1995 |
| GB | 2 339 461 A | 1/2000 |

OTHER PUBLICATIONS

UK Patent Office Search Report.

* cited by examiner

*Primary Examiner*—Lynne H. Browne
*Assistant Examiner*—Kenn Thompson
(74) *Attorney, Agent, or Firm*—Visteon Global Tech., Inc.

(57) ABSTRACT

A driveshaft bearing assembly 10 including a driveshaft connecting rod or member 18, a generally circular or ring-shaped bearing member, assembly or apparatus 20, a bracket assembly 22 and a protective cover or shield member 24. Bearing assembly 10 selectively connects and rotatably supports two members 14, 16 of a multi-piece driveshaft 12.

16 Claims, 1 Drawing Sheet

DRIVESHAFT BEARING ASSEMBLY

(1) FIELD OF THE INVENTION

This invention relates to a driveshaft bearing assembly and more particularly, to a driveshaft bearing assembly having a relatively light-weight, rigid and unitized design which provides for an improved overall balance of the driveshaft.

(2) BACKGROUND OF THE INVENTION

A vehicle driveshaft is typically and operatively coupled to a transmission assembly and to a differential and operatively transfers the transmission produced torque to the differential, thereby causing the vehicle wheels to be desirably and selectively turned. One type of driveshaft, commonly referred to as a "multi-piece" driveshaft, includes multiple shafts, segments or members (e.g., two shafts) which are operatively connected together and which are rotatably supported by a driveshaft bearing assembly.

These types of driveshaft bearing assemblies typically include a connecting assembly which operatively connects or links the two shafts or segments of the driveshaft and a "center" bearing member which rotatably supports the connecting assembly. The connecting assembly typically includes a pair of splined members (e.g., a solid inner splined member and a hollow outer splined member) which are normally manufactured from a relatively heavy material, such as conventional and commercially available steel or iron. Each splined member includes a yoke or a collar portion which is selectively coupled to one shaft or segment of the multi-piece driveshaft. The splined members intermeshingly cooperate to allow and/or to transfer torque and rotation from one segment or portion of the multi-piece driveshaft to the other segment or portion of the driveshaft.

During assembly or installation of the driveshaft and/or the driveshaft bearing assembly, the inner splined member is inserted into the "center" bearing, and the hollow outer member is subsequently guided onto the inner member. The "center" bearing is typically mounted to and/or contained within a bracket or support member which is attached to the body of the vehicle. The driveshaft segments or members are then coupled to the respective yoke or collar portions of the splined members, thereby allowing the bearing assembly to rotatably support the driveshaft and to transfer torque between the two driveshaft segments. While these bearing assemblies allow for the desired communication of torque between portions or segments of the driveshaft and rotatably support the driveshaft, they suffer from some drawbacks.

For example and without limitation, the splined members are relatively difficult and expensive to machine and/or manufacture, and undesirably increase the overall cost of the vehicle. Furthermore, the splined members are normally and relatively loosely connected due to inherent manufacturing tolerances and constraints. This relatively loose connection causes the engaged splined members to undesirably "wobble" as the vehicle is driven, thereby creating imbalance within the driveshaft and producing undesirable noise and vibration harshness ("NVH") which is undesirably communicated into the passenger compartment. Moreover, the relatively heavy splined members decrease the efficiency of the driveshaft and cause a significant amount of wear and fatigue of the center bearing. As a result, the center bearing often requires service or replacement which eliminates the "factory-set" balance of the driveshaft and increases the likelihood and frequency of occurrence of NVH problems.

There is therefore a need for a new and improved driveshaft bearing assembly which overcomes many, if not all, of the previously delineated drawbacks of such prior driveshaft bearing assemblies.

SUMMARY OF THE INVENTION

It is a first object of the invention to provide a driveshaft bearing assembly which overcomes at least some of the previously delineated drawbacks of prior driveshaft bearing assemblies.

It is a second object of the invention to provide a driveshaft bearing assembly which provides for a relatively stiff connection of the shafts, segments or portions of a multi-piece vehicle driveshaft.

It is a third object of the invention to provide a driveshaft bearing assembly which has a relatively lightweight and unitized design.

It is a fourth object of the invention to provide a driveshaft bearing assembly which substantially eliminates the need for service or replacement of the center bearing.

According to a first aspect of the present invention, a bearing assembly is provided. The bearing assembly is adapted for use in a vehicle of the type having a driveshaft which includes a first shaft member and a second shaft member. The bearing assembly includes a bearing member having an outer race and an inner race which is rotatable with respect to said outer race. The bearing assembly further includes a connecting member having a first portion which is coupled to the first shaft member, a second portion which is coupled to the second shaft member, and a generally hollow bearing engaging portion which is fixedly coupled to the first and second portions and which operatively engages the inner race of the bearing, thereby rotatably supporting the driveshaft.

According to a second aspect of the present invention, a method for manufacturing a driveshaft bearing assembly is provided. The method includes the steps of: providing a bearing member having an inner race with a first aperture; providing a first member having a first tubular portion; providing a second member; inserting the tubular portion into the first aperture of the bearing member, thereby operatively mating the first member with the bearing member; and fixedly coupling the second member to the tubular portion of the first member by use of a focused welding procedure, thereby forming a bearing assembly.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
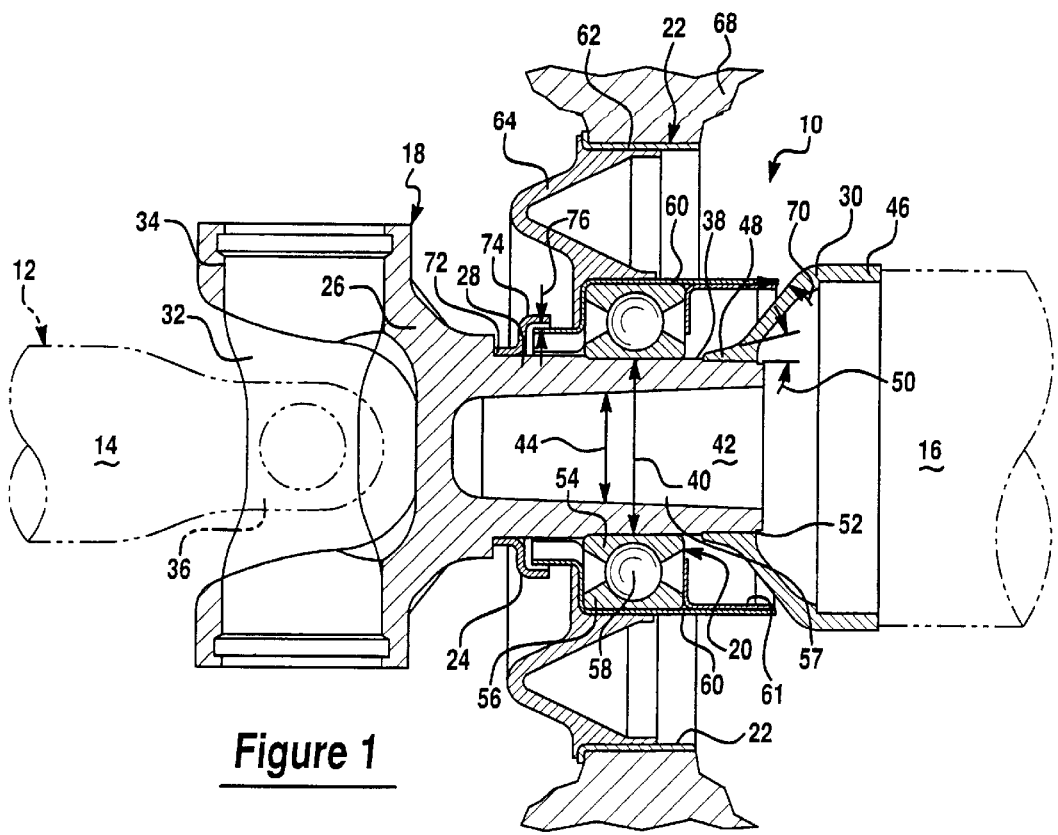
FIG. 1 is a sectional view a bearing assembly which is made in accordance with the teachings of the preferred embodiment of the invention.
Figure 2:
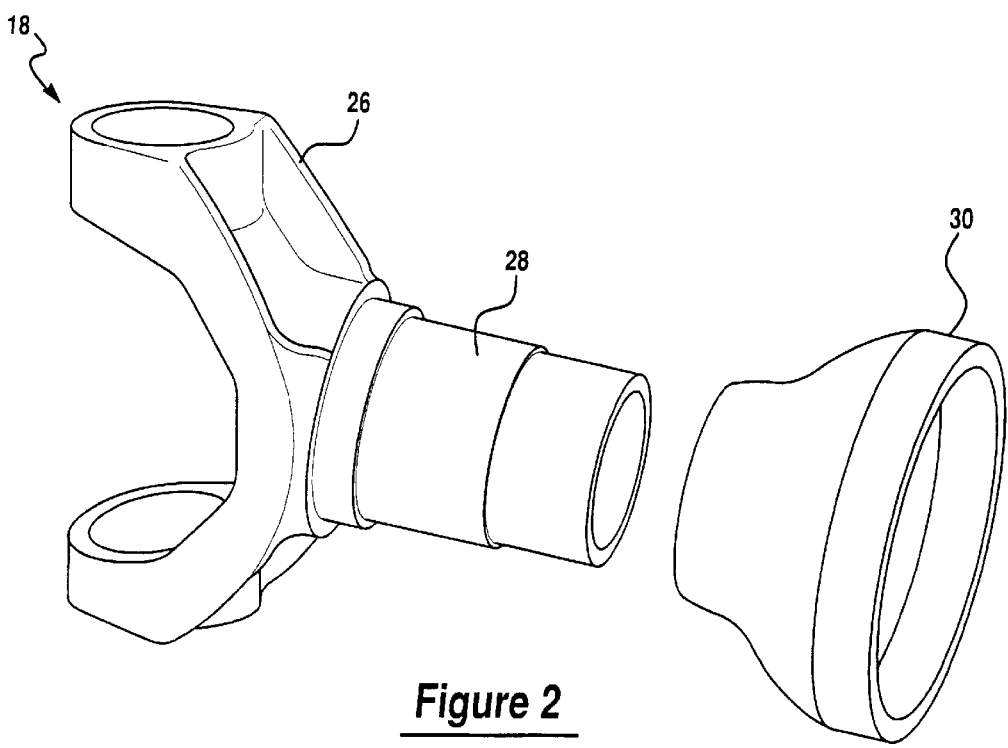
FIG. 2 is a perspective view of a connecting member which is utilized in the bearing assembly shown in FIG. 1.

Referring now to FIGS. 1 and 2, there is shown a driveshaft bearing and/or connecting assembly 10 which is made in accordance with the teachings of the preferred embodiment of the invention. Bearing assembly 10 is adapted for use in combination with a vehicle having a multi-piece driveshaft 12 including a first shaft, segment, or member 14 which is coupled to the vehicle's transmission (not shown) and a second shaft, segment or member 16 which is operatively coupled to the vehicle's differential (not shown). Bearing assembly 10 includes a "unitized" driveshaft connector or connecting member, yoke or rod 18, a generally circular or ring-shaped bearing member, assembly or apparatus 20, a bracket assembly 22, and a protective cover or shield member 24.

Connecting member 18 includes a yoke, member, or portion 26, a generally elongated cylindrical or tubular portion 28 which extends from yoke 26, and a generally conical collar, member, or portion 30, which is fixedly coupled to portion 28. Yoke 26 is operatively coupled to driveshaft segment or member 14 by use of a conventional universal joint, cross joint and/or bearing cup assembly 32 which is connected to end portion 34 of yoke 26 and to end portion 36 of member 14. In alternate embodiments, yoke 26 and joint 32 are respectively replaced with a "three-lobe" yoke and a tripod bearing. In other alternate embodiments, joint 32 and yoke 26 are respectively replaced with a constant velocity joint and a housing, or with any other suitable connecting joints or assemblies. Portion 28 includes a bearing engaging outer annular surface 38 having a diameter 40, and a generally cylindrical "tapered" inner channel or cavity 42 having a diameter 44. In the preferred embodiment, diameter 40 is larger than the diameter of a conventional solid connecting rod or member. Due to the interior channel or cavity 42, portion 28 weighs significantly less than a conventional solid rod or member. Additionally, portion 28 provides increased strength and torsional rigidity over prior solid rods or members due to the relatively large or increased diameter 40.

Portion 30 includes a relatively wide end portion 46 which is conventionally attached, welded or otherwise connected to member 16 and a generally narrow tapered end portion 48 which is fixedly attached or connected to portion 28. In the preferred embodiment, end portion 48 is gradually tapered substantially along an angle 50. This gradual taper is effective to substantially reduce and/or dissipate the relatively high stress and torsional loads which are imparted at the junction of portion 28 and portion 48 during operation of the driveshaft. In one non-limiting embodiment, angle 50 is equal to approximately 15 degrees. In the preferred embodiment of the invention, end portion 48 is attached or connected to portion 28 (e.g., to outer annular surface 38) by use of a conventional laser welding technique and/or apparatus. In one non-limiting embodiment, a 6–10 kilowatt laser is used to weld portions 48 and 28 together. In other alternate embodiments, other low-wattage and/or highly localized welding techniques or other types of bonding techniques which generate a relatively low amount of heat are used to fixedly connect portions 48 and 28 (e.g., friction welding, or a thermal interference fit combined with laser welding).

In the preferred embodiment of the invention, portions 26, 28 and 30 are each manufactured and/or formed from a relatively strong, rigid and durable material such as high strength cast iron, steel or aluminum.

In the preferred embodiment of the invention, bearing member or assembly 20 is a conventional fully sealed, pre-lubricated bearing assembly having an inner race 54 which engages the outer annular surface 38 of portion 28, an outer race 56 which is coupled to bracket 22, and a plurality or ball-bearings, rollers or members 58 which allow the inner race 54 to rotate with respect to outer race 56. In the preferred embodiment, inner race 54 is press-fitted to surface 38, and outer race 56 is pressed into inner portion 60 of support bracket assembly 22. Inner race 54 includes a central aperture 57 having a diameter which is slightly less than diameter 40.

Bracket assembly 22 includes an outer annular portion or member 62 which is fixedly and conventionally connected to a portion 68 of the vehicle body assembly or frame assembly, an inner annular portion or member 60 which operatively retains and supports bearing 20, and a flexible (e.g., rubber) support member or portion 64 which is disposed between and operatively connects portions or members 60 and 62. Portion 60 extends over a portion of collar 30 and is separated from collar 30 by a relatively small gap or distance 70, effective to substantially prevent dirt, dust, and/or other particles from contaminating and/or interfering with the operation of bearing 20.

Dust shield, cover or ring 24 includes a narrow or inner annular portion 72 and a wider or outer annular portion 74 which is integrally formed with portion 72. Portion 72 is press-fitted to and is peripherally disposed around surface 38. Portion 74 extends over a portion of inner portion 60 of bracket 22 and is separated from portion 60 by a relatively small gap or distance 76, thereby substantially preventing dirt, dust, and/or other particles from contaminating and/or interfering with the operation of bearing 20.

In the preferred embodiment of the invention, bearing assembly 10 is assembled as follows. Dust shield 24 is coupled (e.g., press-fitted) to portion 28. Bearing assembly 20 is fixedly and conventionally coupled to bracket 22. Bearing retainer 61 is then press-fitted into portion 60 to hold bearing 20 securely within bracket 22. More particularly, outer race 56 is press-fitted to inner portion 60 of bracket 22. Portion 28 is then inserted into aperture 57 of bearing 20 until the inner race 54 press-fitted to outer surface 38 of portion 28 and resides in the position illustrated in FIG. 1. Once bearing 20 has been press-fitted to portion 28, member 30 (i.e., end portion 48) is press-fitted to the end of portion 28. Member 30 is then permanently and fixedly coupled to portion 28 using a relatively low-wattage or low heat producing "focused" welding technique or procedure.

In the preferred embodiment of the invention, a laser welding technique, apparatus or procedure is used (e.g., a 6 to 10 kilowatt laser welder) to weld portions 28 and 30 together at the inner juncture 52. Collar 30 is made of low carbon cast or forged steel, and portion 28 is made of high strength cast or forged steel. When laser welded together, the laser is focused into the low carbon steel of collar 30 in relative close proximity to juncture 52. The steel of portion 30 melts and mixes freely with the steel of portion 28, thereby forming a structurally strong weld. The high strength steel of portion 28 allows integrally formed portions 28 and 26 to have a hollow core or cavity 42 which reduces the overall weight of the connecting member 18 and bearing assembly 10. In other alternate embodiments other types of "focused" or reduced heat generating welding techniques may be used such as magnetic arc welding, and friction welding.

By using a low heat generating and highly focused welding technique at juncture 52, the amount of heat which is conducted through connector 18 and which is transferred to bearing 20 is minimized. Hence, the temperature of portions of connector 18 and bearing 20 which are relatively remote from juncture 52 remain relatively "cool". Importantly, this localized and relatively "cool" welding procedure allows member 30 to be welded to portion 28 without applying substantial amounts of heat to bearing assembly 20, which could degrade and/or destroy the lubrication and seal of the bearing 20, thereby causing bearing 20 to malfunction or fail.

Once bearing assembly 10 is assembled, portions 14 and 16 of driveshaft 12 are respectively connected to yoke 26 and collar 30 in a conventional manner and the entire assembly is operatively mounted to the vehicle body. In the preferred embodiment, portion 14 is coupled to yoke 26 by use of a conventional universal joint 32 and portion 16 is laser or friction welded to collar 30. In other alternate embodiments, collar 30 is attached to portion 14 and yoke 26 is attached to portion 16 with the necessary cross and bearing assembly 32 and attaching yoke 36.

In operation, the torque, supplied by the vehicle transmission is communicated to member 14. Bearing assembly 10 and connecting member 18 cooperatively and rotatably support and connect members 14 and 16, and are effective to transfer the transmission produced torque to member 16 and to the differential. Importantly, the use of hollow or tubular connector member 18 and portions 28, 30 allows for a relatively light-weight bearing assembly 10 which substantially reduces the amount of vibration and noise which emanates from the operatively formed driveshaft 12. Furthermore, the "unitized" design of connecting member 18 (e.g. the solid, stiff and rigid connection between portions 26, 28 and 30) substantially eliminates wobble within the bearing assembly 10 and substantially improves the overall balance of driveshaft 12 over prior "splined" connecting members.

The relatively lightweight and hollow or tubular construction of connecting member 18 allows portion 28 to have a relatively large diameter 40 while providing a significant decrease in the overall weight relative to prior driveshaft connector and/or bearing assemblies. The relatively large diameter of portion 28 efficiently distributes the applied torsional loads over a larger surface area, thereby allowing bearing assembly 10 and driveshaft 12 to support relatively larger torques at relatively higher speeds than prior driveshaft assemblies. Further, it should be appreciated that the relatively stiff, rigid and fixed connection of portions 26, 28 and 30 substantially reduces the amount of noise and/or vibrations which are generated from the driveshaft 12 and bearing assembly 10.

It is to be understood that the invention is not to be limited to the exact construction and/or method which has been illustrated and discussed above, but that various changes and/or modifications may be made without departing from the spirit and the scope of the invention.

What is claimed is:

1. A driveshaft connecting assembly for use in combination with a driveshaft of the type having a first shaft member and a second shaft member and made by the process of providing a first member having a first portion which is selectively attachable to said first shaft member and a generally tubular second portion which extends from said first portion; providing a second conical shaped member having a first end and a second smaller end, said first side being fixedly attached to said second shaft member and said second smaller end being fixedly attached to said generally tubular portion, thereby forming an acute angle of engagement; providing a bearing assembly having an inner race; press-fitting said inner race of said bearing assembly onto said generally tubular second portion of said first member; and fixedly coupling said second member to said second portion of said first member, thereby cooperatively forming a unitized connecting assembly.

2. The driveshaft connecting assembly of claim 1 wherein said process further comprises providing a shield member; and disposing said shield member around said bearing assembly, thereby substantially covering said bearing assembly.

3. The driveshaft connecting assembly of claim 2 wherein said bearing assembly comprises a fully sealed bearing assembly.

4. The driveshaft connecting assembly of claim 1 wherein said first portion of said first member comprises a yoke which is selectively attachable to said first shaft member.

5. The driveshaft connecting assembly of claim 1 wherein said second member is laser welded to said second portion of said first member.

6. A method for manufacturing a driveshaft bearing assembly, said method comprising the steps of:

providing a bearing member having an inner race with a first aperture;

providing a first member having a yoke and a tubular portion;

providing a second member comprising a generally conical shaped collar having a first open end diameter and a second open end diameter which is substantially smaller than said first open end diameter;

inserting said tubular portion into said first aperture of said bearing member, thereby operatively mating said first member with said bearing member;

fixedly coupling said second member to said tubular portion of said first member by use of a focused welding procedure, thereby forming a bearing assembly; and coupling said second open end of said collar to said hollow middle portion, thereby creating a certain acute angle of engagement.

7. The method of claim 6 wherein said focused welding procedure comprises a laser welding procedure.

8. The method of claim 6 further comprising the steps of:

providing an annular shield member; and disposing said annular shield member on said tubular portion, thereby covering said bearing member.

9. The method of claim 6 wherein said driveshaft bearing assembly is adapted for use in combination with a vehicle of the type having a driveshaft including a first shaft and a second shaft, said method further comprising the steps of:

connecting said first shaft to said first member; and connecting said second shaft to said second member.

10. The method of claim 9 wherein said vehicle includes a body, said method further comprising the steps of:

providing a bracket member;

coupling said bearing member to said bracket member; and mounting said bracket member to said vehicle body, thereby operatively supporting said bearing member and said driveshaft.

11. A bearing assembly for use in a vehicle of the type having a driveshaft which includes a first shaft member and a second shaft member, said bearing assembly comprising:

at least one bearing having an outer race and an inner race which is rotatable with respect to said outer race;

a yoke which is coupled to said first shaft member, said yoke including a hollow middle portion having a certain diameter, said hollow middle portion being coupled to said inner race of said at least one bearing; and a collar having a generally conical shape and including a first open end having a first diameter and being coupled to said second shaft member, said collar further having a second open end having a second diameter which is smaller than said first diameter, said second end further having an engagement portion which frictionally receives said hollow middle portion and which forms a certain acute angle with said hollow middle portion, wherein said at least one bearing, said yoke, and said collar cooperating to rotatably support said driveshaft and wherein said driveshaft imparts stress and torsional loads upon said engagement portion, and wherein said certain acute angle is effective to substantially reduce the amount of said stress and torsional loads which are imparted upon said engagement portion by said driveshaft.

12. The bearing assembly of claim 1 wherein said hollow middle portion is integrally formed with said yoke.

13. The bearing assembly of claim 1 wherein said collar is laser welded to said middle portion.

14. The bearing assembly of claim 1 wherein said at least one bearing further includes a shield member vehicle further includes a body, said bearing assembly further comprising a bracket which is mounted to said body and which operatively supports said bearing.

15. The bearing assembly of claim 1 wherein said certain acute angle is fifteen degrees.

16. The driveshaft connecting assembly of claim 1, wherein said angle of engagement is approximately fifteen degrees.

* * * * *